(12) United States Patent
Chew

(10) Patent No.: US 10,885,869 B2
(45) Date of Patent: Jan. 5, 2021

(54) GATEWAY ASSISTED OUT-OF-BAND KEYBOARD, VIDEO, OR MOUSE (KVM) FOR REMOTE MANAGEMENT APPLICATIONS

(71) Applicant: Intel Corporation, Santa Clara, CA (US)

(72) Inventor: Yen Hsiang Chew, Penang (MY)

(73) Assignee: Intel Corporation, Santa Clara, CA (US)

( * ) Notice: Subject to any disclaimer, the term of this patent is extended or adjusted under 35 U.S.C. 154(b) by 491 days.

(21) Appl. No.: 15/709,304

(22) Filed: Sep. 19, 2017

(65) Prior Publication Data

US 2019/0088233 A1 Mar. 21, 2019

(51) Int. Cl.
| | |
|---|---|
| *H04N 7/167* | (2011.01) |
| *G09G 5/00* | (2006.01) |
| *G06F 21/60* | (2013.01) |
| *G06F 21/82* | (2013.01) |
| *H04N 19/40* | (2014.01) |

(52) U.S. Cl.
CPC .......... *G09G 5/003* (2013.01); *G06F 21/602* (2013.01); *G06F 21/82* (2013.01); *G09G 2358/00* (2013.01); *G09G 2370/025* (2013.01); *G09G 2370/24* (2013.01); *H04N 19/40* (2014.11)

(58) Field of Classification Search
CPC ....... G06F 2212/402; G06F 2203/0383; G06F 21/83
USPC ......................................................... 380/200
See application file for complete search history.

(56) References Cited

U.S. PATENT DOCUMENTS

| | | | | |
|---|---|---|---|---|
| 2007/0058657 | A1* | 3/2007 | Holt ........................ | H04L 41/28 370/438 |
| 2007/0115992 | A1* | 5/2007 | Weinstock ............ | G06F 3/0227 370/392 |
| 2009/0300698 | A1* | 12/2009 | Quigley ............. | H04N 21/4126 725/114 |
| 2012/0098841 | A1* | 4/2012 | Emerson ................ | G09G 5/008 345/520 |
| 2012/0331032 | A1* | 12/2012 | Balachandran ....... | H04L 69/164 709/202 |

(Continued)

OTHER PUBLICATIONS

Lantronix, Nov. 2013, Spider and SpiderDuo KVM-over-IP Devices User Guide, pp. 1-133.*

(Continued)

*Primary Examiner* — Alexander Lagor
*Assistant Examiner* — Jenise E Jackson
(74) *Attorney, Agent, or Firm* — Schwabe, Williamson & Wyatt, P.C.

(57) ABSTRACT

Embodiments herein relate to provision of keyboard, video, and mouse (KVM) connections. In various embodiments, a gateway apparatus may include a KVM remote connection manager, a local area network (LAN) port coupled with the KVM remote connection manage, and a wide area network (WAN) port coupled with the KVM remote connection manager, where the KVM remote connection manager includes a video encoder to encode an out-of-band redirected video stream received at the LAN port from a managed client device, destined for a remote management console, and send the encoded video stream to the remote management console via the WAN port. Other embodiments may be described and/or claimed.

17 Claims, 9 Drawing Sheets

(56) References Cited

U.S. PATENT DOCUMENTS

| | | | |
|---|---|---|---|
| 2016/0142591 A1* | 5/2016 | Modai | H04N 5/04 348/14.08 |
| 2016/0191468 A1* | 6/2016 | Basha P.R. | H04L 63/0428 713/176 |
| 2016/0248792 A1* | 8/2016 | Tidwell | G06F 16/2455 |
| 2018/0351923 A1* | 12/2018 | Rohel | G06F 21/6254 |

OTHER PUBLICATIONS

Folgar et al, Study of the KVM CPU Performance of Open-Source Cloud Management Platforms, May 2015, IEEE, pp. 1225-1228.*
Kawahara et al, The Continuity of Out-of-Band Remote Management Across Virtual Machine, Dec. 2014, IEEE, pp. 176-185.*

* cited by examiner

GATEWAY ASSISTED OUT-OF-BAND KEYBOARD, VIDEO, OR MOUSE (KVM) FOR REMOTE MANAGEMENT APPLICATIONS

FIELD

Embodiments of the present disclosure generally relate to the field of keyboard, video, and/or mouse (KVM) provision, and more particularly to out-of-band KVM provision for remote management applications.

BACKGROUND

In some legacy approaches, out-of-band remote management of a computing client may be performed through use of a management controller co-located with the computing environment of the computing client and a remote management console. Examples of such management controller may include management engine, security co-processor, Desktop and mobile Architecture Hardware (DASH) compliant Network Interface Card (NIC). When a computing client is down, information technology (IT) personnel may initiate an out-of-band KVM connection to the faulty computing client via the remote management console to diagnose and repair the computing client. The management controller co-located with the main computing environment of the computing client may direct the computing client to redirect its display output video stream to the remote management console via a network (e.g., a wide area network (WAN)), while keyboard and mouse inputs from the remote management console may be redirected to the computing client via a similar, or the same, WAN network. The KVM video stream may be an unencoded video stream because the management controller typically does not include a video encoding hardware accelerator and the video encoding hardware in the main computing environment of the faulty computing client may not be accessible to the management controller. In legacy approaches, this may result in sending an uncompressed video stream through a network, which may consume significant bandwidth, may distort the KVM video causing it to look jerky and/or have poor response times to user input, and may cause the KVM to timeout and disconnect.

BRIEF DESCRIPTION OF THE DRAWINGS

Embodiments of the out-of-band KVM devices and methods of the present disclosure may overcome these limitations. The techniques will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
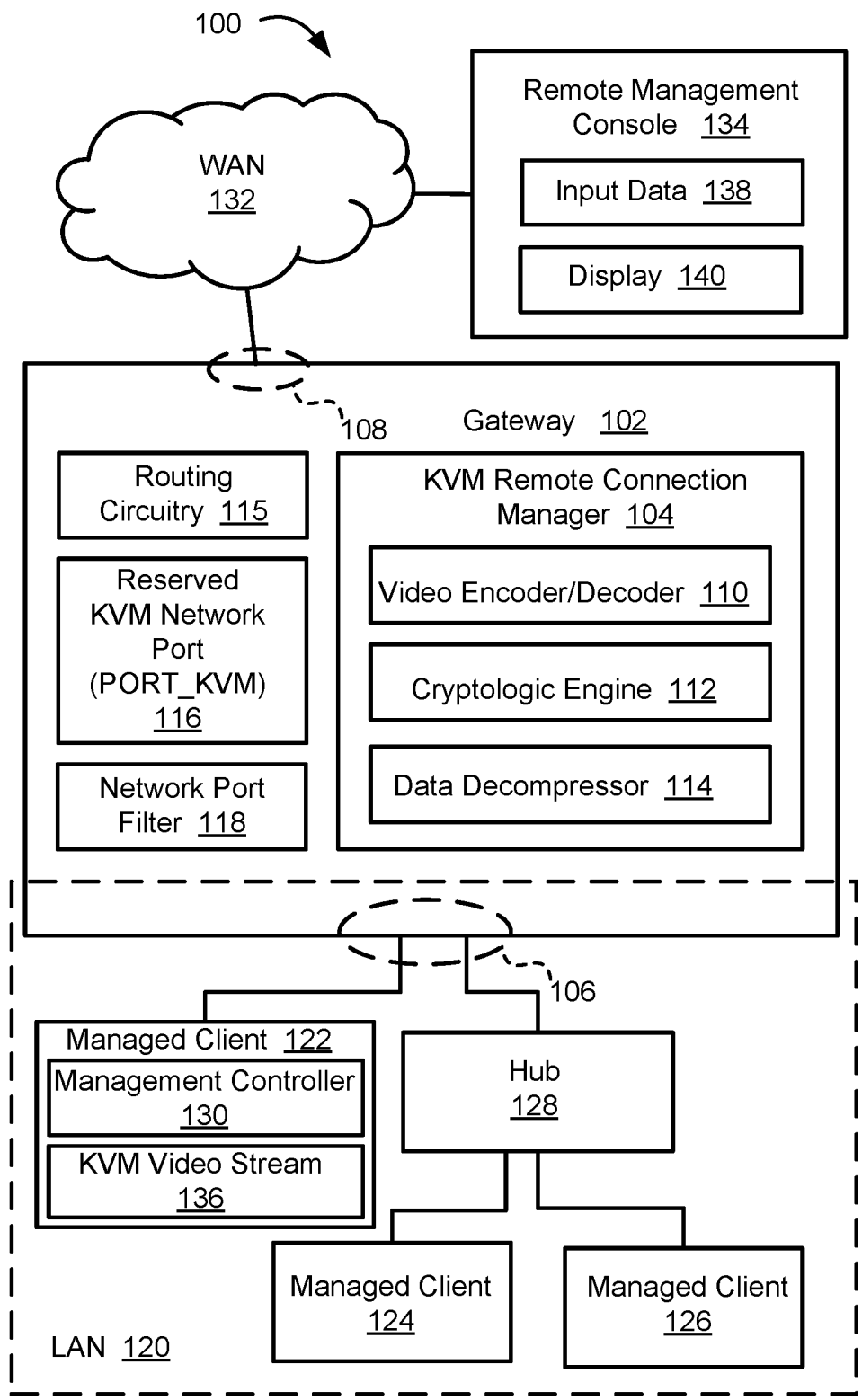
FIG. 1 is a block diagram of a system that includes a gateway having a KVM remote connection manager, according to various embodiments.

Embodiments of the present disclosure describe devices, systems, and techniques to provide KVM connections with an edge or Fog network device (e.g., an edge or Fog gateway) to assist a management controller in encrypting, encoding, and/or transcoding a KVM video stream before the video stream is sent to a remote management console. Some embodiments may include compression of data at the remote management console before sending to the managed client and decompression of the data by the edge or Fog network device. In various embodiments, a gateway apparatus may include a KVM remote connection manager, a local area network (LAN) port coupled with the KVM remote connection manage, and a wide area network (WAN) port coupled with the KVM remote connection manager, where the KVM remote connection manager includes a video encoder to encode an out-of-band redirected video stream received at the LAN port from a managed client device, destined for a remote management console, and send the encoded video stream to the remote management console via the WAN port.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of a system 100 that includes a gateway 102 having a KVM remote connection manager 104, according to various embodiments. In some embodiments, the KVM remote connection manager 104 may be referred to as a KVM management module. In some embodiments, the gateway 102 may be a network device such as an edge or Fog gateway that may include a LAN port 106 coupled with the KVM remote connection manager 104 and a WAN port 108 coupled with the KVM remote connection manager 104. In some embodiments, the gateway 102 may be a local edge cloud gateway. In various embodiments, the KVM remote connection manager 104 may include a video encoder/decoder 110 a cryptologic engine 112, a data decompressor 114, and/or one or more other components, not shown for clarity. In some embodiments, the video encoder/decoder 110 may include a hardware accelerator. In various embodiments, the gateway 102 may be a KVM dedicated gateway, i.e., a gateway specifically provided to assist out-of-band provision of KVM from a client device to a remote management device. In other embodiments, the gateway 102 may be a KVM enhanced gateway, i.e., a gateway provided to route network traffic, but enhanced to include technology of the present disclosure to assist out-of-band provision of KVM from a client device to a remote management device. In some embodiments, the gateway 102 may include routing circuitry 115 that may route network traffic for a KVM enhanced gateway. In some embodiments, where the gateway 102 may be a KVM enhanced gateway, the KVM routing circuitry 115 may route only network traffic unrelated to remote KVM provision. In other embodiments, the routing circuitry may route both KVM network traffic in conjunction with the KVM remote connection manager 104 and network traffic unrelated to remote KVM provision. In some embodiments, where the gateway 102 may be a KVM enhanced gateway, the KVM routing circuitry 115 may be coupled with the network port filter 118. In various embodiments, the network traffic unrelated to remote KVM provision may be received at one or more of the LAN port 106 or the WAN port 108.

In some embodiments, the gateway 102 may include a reserved KVM network port 116 and/or a network port filter 118. In some embodiments, the reserved KVM network port 116 may be referred to as PORT_KVM, which may correspond to a network port number. In some embodiments, one or more additional network ports may be reserved for KVM, and/or a range of network port numbers may be reserved for KVM. In various embodiments, the network port filter 118 may be coupled with the LAN port 106 and may be configured to identify KVM remote network packets that target a network port (e.g., PORT_KVM) of the gateway 102 reserved for out-of-band KVM. In some embodiments, the network port filter 118 may intercept network packets identified as targeting PORT_KVM and may forward those packets to the KVM remote connection manager 104. In some embodiments, the network port filter 118 may filter network packets (e.g., from an out-of-band KVM video stream) from an ingress LAN network interface of the gateway 102. In some embodiments, where the gateway 102 may be a KVM enhanced gateway, the network port filter 118 may forward packets that do not target PORT_KVM to the routing circuitry 115. In various embodiments, some or all components of the gateway 102 may be implemented in hardware, firmware, a field programmable gate array (FPGA), an application specific integrated circuit (ASIC), with software and one or more processors, or some combination thereof.

Although network packet filtering is used in some embodiments to intercept network packets for forwarding to the KVM remote connection manager 104, it should be understood that any other suitable technique may be used in various embodiments. For example, network packets may be detected, filtered, and/or intercepted based at least in part on a packet header, a medium access control (MAC) address, an internet protocol (IP) address, an ingress port, or any other suitable technique. It should also be understood that when filtering and/or performing other actions based at least in part on a reserved and/or designated port PORT_KVM is discussed in relation to any of FIGS. 1-6, that any other suitable technique may be used for network packet interception in some embodiments.

In some embodiments, the gateway 102 may be communicatively coupled with a LAN 120 via the LAN port 106. In various embodiments, the LAN port 106 may include a wired and/or a wireless connection to the LAN 120. In various embodiments, one or more managed clients such as a first managed client 122, a second managed client 124, and a third managed client 126 may be directly or indirectly (e.g., through a hub 128) coupled with the LAN port 106. In some embodiments, the gateway 102 may be a LAN edge or Fog gateway that may be a single hop from the first managed client 122, the second managed client 124, and/or the third managed client 126. In various embodiments, the first managed client 122 may include a management controller 130. In some embodiments, the second managed client 124 and/or the third managed client 126 may also have a management controller, not shown for clarity, and/or may generate out-of-band redirected video streams, not shown for clarity. In various embodiments, the gateway 102 may be communicatively coupled with a WAN 132 via the WAN port 108. In some embodiments, a remote management console 134 may be communicatively coupled with the WAN port 108 over the WAN 132.

In some embodiments, the video encoder/decoder 110 of the KVM remote connection manager 104 may encode an out-of-band redirected video stream (e.g., a KVM video stream 136) from one of the managed clients (e.g., first managed client 122) received at the LAN port 106 destined for a remote management console (e.g., remote management console 134) and send the encoded video stream to the remote management console 134 via the WAN port 108. In some embodiments, the KVM remote connection manager 104 may work in conjunction with the routing circuitry 115 and may send the encoded video stream in repackaged network packets that are sent by the routing circuitry 115 to the remote management console 134 via the WAN port 108. In other embodiments, the KVM remote connection manager 104 may handle routing of the encoded video stream to the remote management console 134 and the routing circuitry 115 may handle network traffic other than out-of-band KVM network traffic. In some embodiments, the video encoder/decoder 110 may encode a raw out-of-band KVM video stream into a format such as H.264, H.265, audio video interleave (AVI), or any other suitable format. In some embodiments, the video encoder/decoder 110 may transcode an out-of-band KVM video stream. In some embodiments, transcoding may include changing a resolution and/or a frame rate of the out-of-band KVM video stream. In some embodiments, transcoding may include re-encoding and/or reformatting the out-of-band KVM video stream. In some embodiments, the remote management console 134 may share the same network port number (e.g., PORT_KVM) for intercepting network packets from the managed clients. In some embodiments, the video encoder/decoder 110 or some other component of the KVM remote connection manager 104 may repackage the encoded and/or encrypted out-of-band KVM video stream into network packets with the same destination IP address (e.g., IP address of the remote management console 134) and the same network port (e.g., PORT_KVM) before sending the encoded video stream to the remote management console 134 via an egress WAN network interface (e.g., WAN port 108).

In various embodiments, the out-of-band redirected video stream may be received at the LAN port 106 in packets that target a network port of the gateway 102 reserved for out-of-band KVM. In some embodiments, the out-of-band redirected video stream network packets may have a destination IP address of the remote management console 134 and/or may target an out-of-band KVM network port (e.g., PORT_KVM). In some embodiments, the out-of-band KVM network port may be a user defined network port. In some embodiments, the out-of-band redirected video stream received at the LAN port 106 may include raw video frames. In some embodiments, the cryptologic engine 112 may encrypt the encoded video stream before the encrypted encoded video stream is sent to the remote management console 134. In various embodiments, the KVM remote connection manager 104 may change one or more of a resolution, a frame rate, a color format, or a color depth of the video stream before sending the encoded video stream to the remote management console 134.

In some embodiments, the remote management console 134 may generate input data 138 (e.g., a keyboard signal, a mouse signal, or data such as a boot image) and may send some or all of the input data 138 to the gateway 102 over the WAN 132. In some embodiments, the input data 138 may include an ISO recovery boot image. In various embodiments, the remote management console 134 may include one or more input devices (e.g., keyboard, mouse, and/or touchscreen), not shown for clarity, one or more data storage devices, not shown for clarity, one or more processors, not shown for clarity, and/or any other suitable components that may be used to generate or retrieve the input data 138 in some embodiments. In some embodiments, the remote management console 134 may encrypt some or all of the input data 138 before sending the encrypted data to the gateway 102. In various embodiments, the cryptologic engine 112 may decrypt one or more of an encrypted keyboard signal, an encrypted mouse signal, or encrypted data received at the WAN port 108 from the remote management console 134. In some embodiments, the KVM remote connection manager 104 may send the decrypted keyboard signal, mouse signal, or data to a managed client device (e.g., managed client 122, 124, or 126) via the LAN port 106. In some embodiments, the input data 138 may include compressed data (e.g., a boot image) and the data decompressor 114 of the KVM remote connection manager 104 may decompress compressed data received at the WAN port 108 from the remote management console 134.

In various embodiments, communication between the remote management console 134, a managed client computing device (e.g., managed client 122, 124, or 126), and a single hop LAN edge or Fog gateway (e.g., gateway 102) for the managed client computing device may be established in any suitable manner. In some embodiments, the remote management console 134 may be configured to receive KVM video stream network packets from a designated network port (e.g., PORT_KVM). In some embodiments, the managed client computing device may be configured to redirect its display output video stream to the remote management console 134 using the destination IP address of the remote management console and the designated network port. In various embodiments, the remote management console 134 may include a display 140. In some embodiments, the remote management console 134 may display the redirected video stream on the display 140. In some embodiments, the edge or Fog gateway device may be pre-provisioned to inspect the port number of incoming network packets from all of its LAN ingress ports. In some embodiments, if a network packet port number matches PORT_KVM, the edge or Fog gateway device may pass the network packet to a KVM management module (e.g., KVM remote connection manager 104). In some embodiments, the KVM management module may perform some processing on the video stream, which may include encoding, transcoding, and/or encrypting the video stream. In some embodiments, the edge or Fog gateway may repackage the encoded and/or encrypted video stream into network packets with the original destination IP address (e.g., the IP address of the remote management console 134) and port number (e.g., PORT_KVM) and may send the network packets to the remote management console 134 via its WAN egress network port.

In various embodiments, input data (e.g., input data 138) such as KVM keyboard and mouse signals, an ISO recovery boot image, and/or any other suitable input data, may be compressed and/or encrypted by the remote management console 134. The remote management console 134 may send the compressed and/or encrypted input data to a managed client (e.g., managed client 122, 124, or 126) via a single hop edge or Fog gateway (e.g., gateway 102) for the managed client. In some embodiments, the edge or Fog gateway may filter incoming network packets from its WAN ingress port by inspecting the port number of incoming network packets and may forward all network packets targeting PORT_KVM to a KVM management module (e.g., KVM remote connection manager 104). In some embodiments, the KVM management module may decompress and/or decrypt the input data and may pass the input data to the managed client computing device through its egress LAN network port.

In some embodiments, the cryptologic engine 112 may enable secure KVM communication between a remote management console (e.g., remote management console 134) and its managed client computing device (e.g., managed client 122, 124, or 126). In some embodiments, the managed client may be at least partially non-functional, and/or some or all hardware acceleration (e.g., encryption engine, video encoding hardware, compression engine) in the managed client and/or its management controller may not be available for use during the KVM session. In some embodiments, no hardware acceleration in the managed client may be used, with hardware acceleration being performed by the gateway 102 (e.g., by the video encoder/decoder 110, the cryptologic engine 112, and/or the data decompressor 114). In some embodiments, use of the gateway 102 to encode and/or transcode the out-of-band KVM video stream from a managed client may enhance the viewing quality of the out-of-band KVM video stream (e.g., on the display 140) in comparison to legacy approaches such as by reducing jitter and/or improving image quality. In some embodiments, use of the gateway 102 to encrypt/decrypt communication between the remote management console 134 and a managed client may provide more secure communication than legacy approaches that allow unsecured communication between the remote management console 134 and a managed client. In some embodiments, use of the gateway 102 to decompress data from the remote management console 134 may speed up a remote boot process and/or reduce managed client down time in comparison to legacy approaches that do not use compressed data between a remote management console and a managed client. In various embodiments, the gateway 102 may be configured and/or managed from the remote management console 134.

Figure 2:
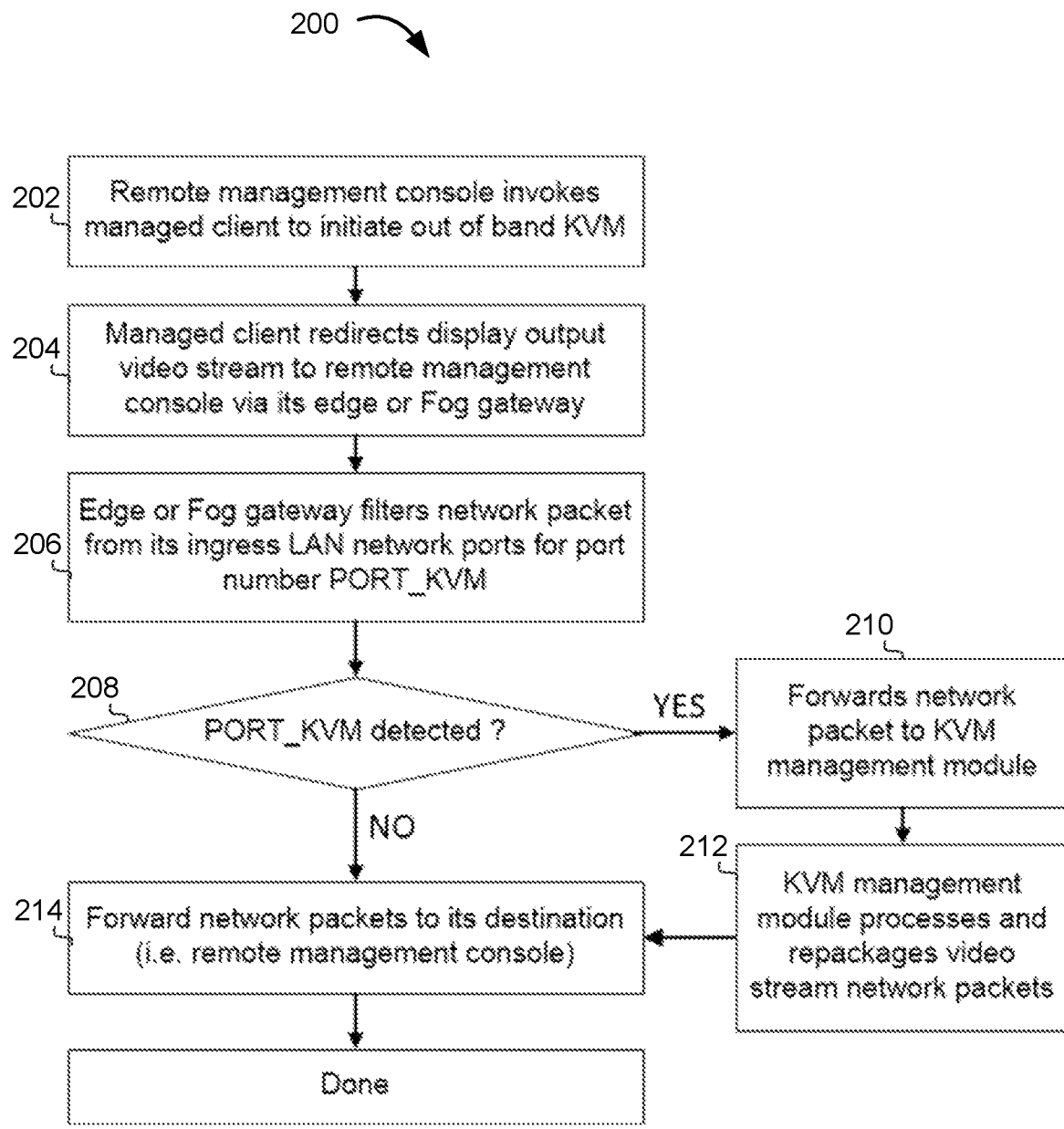
FIG. 2 is a flow diagram illustrating a method of providing a gateway assisted KVM connection, according to various embodiments.

FIG. 2 is a flow diagram illustrating a method 200 of providing a gateway assisted KVM connection, according to various embodiments. In some embodiments, some or all of the method 200 may be practiced by components shown and/or described with respect to the system 100 of FIG. 1, the cloud and internet of things (IoT) network 400 of FIG. 4, and/or the computing device 500 of FIG. 5. In some embodiments, at a block 202, a remote management console (e.g., remote management console 134) may invoke a managed client (e.g., managed client 122, 124, or 126) to initiate an out-of-band KVM. In some embodiments, when a managed client computing device crashes, an information technology (IT) specialist may use the remote management console to invoke a remote management controller (e.g., remote management controller 130) of the managed client to initiate an out-of-band KVM to the remote management console via a WAN (e.g., WAN 132). In some embodiments, the out-of-band KVM may be initiated based at least in part on a client initiated remote access (CIRA) request, such as a fast call for help, which may also be referred to as an SOS command in some embodiments.

At a block 204, the managed client may redirect a display output video stream (e.g., out-of-band redirected video stream 136) to the remote management console via an edge or Fog gateway for the managed client (e.g., gateway 102). In some embodiments, the remote management controller may direct the managed client computing device to redirect its display output video stream through a single hop edge or Fog gateway LAN network interface (e.g., LAN port 106). At a block 206, the edge or Fog gateway may filter network packets (e.g., with network port filter 118) from its ingress LAN network ports (e.g., LAN port 106) for port number PORT_KVM (e.g., a network port reserved for out-of-band KVM).

At a decision block 208, it may be determined whether a packet targeting PORT_KVM is detected (e.g., by network port filter 118). If, at the decision block 208, it is determined that a packet targeting PORT_KVM is detected, the packet may be forwarded to a KVM management module (e.g., KVM remote connection manager 104) at a block 210. At a block 212, the KVM management module may process and/or repackage video stream network packets that were forwarded at the block 210. In some embodiments, the KVM management module may process and/or repackage the video stream network packets at the block 212 by encoding (e.g., with video encoder/decoder 110), encrypting (e.g., with cryptologic engine 112), or performing one or more other actions (e.g., changing one or more of a resolution, a frame rate, a color format, or a color depth of the video stream). In some embodiments, at a block 214, the method 200 may include forwarding network packets from the edge or Fog gateway to their destination (e.g., remote management console 134 for display on the display 140). In various embodiments, if PORT_KVM was detected at the decision block 208, forwarding network packets may include forwarding repackaged network packets representing the repackaged and/or reprocessed video stream. In some embodiments, if PORT_KVM was not detected at the decision block 208, forwarding network packets at the block 214 may include forwarding network packets that may not be related to the provision of a KVM connection.

Figure 3:
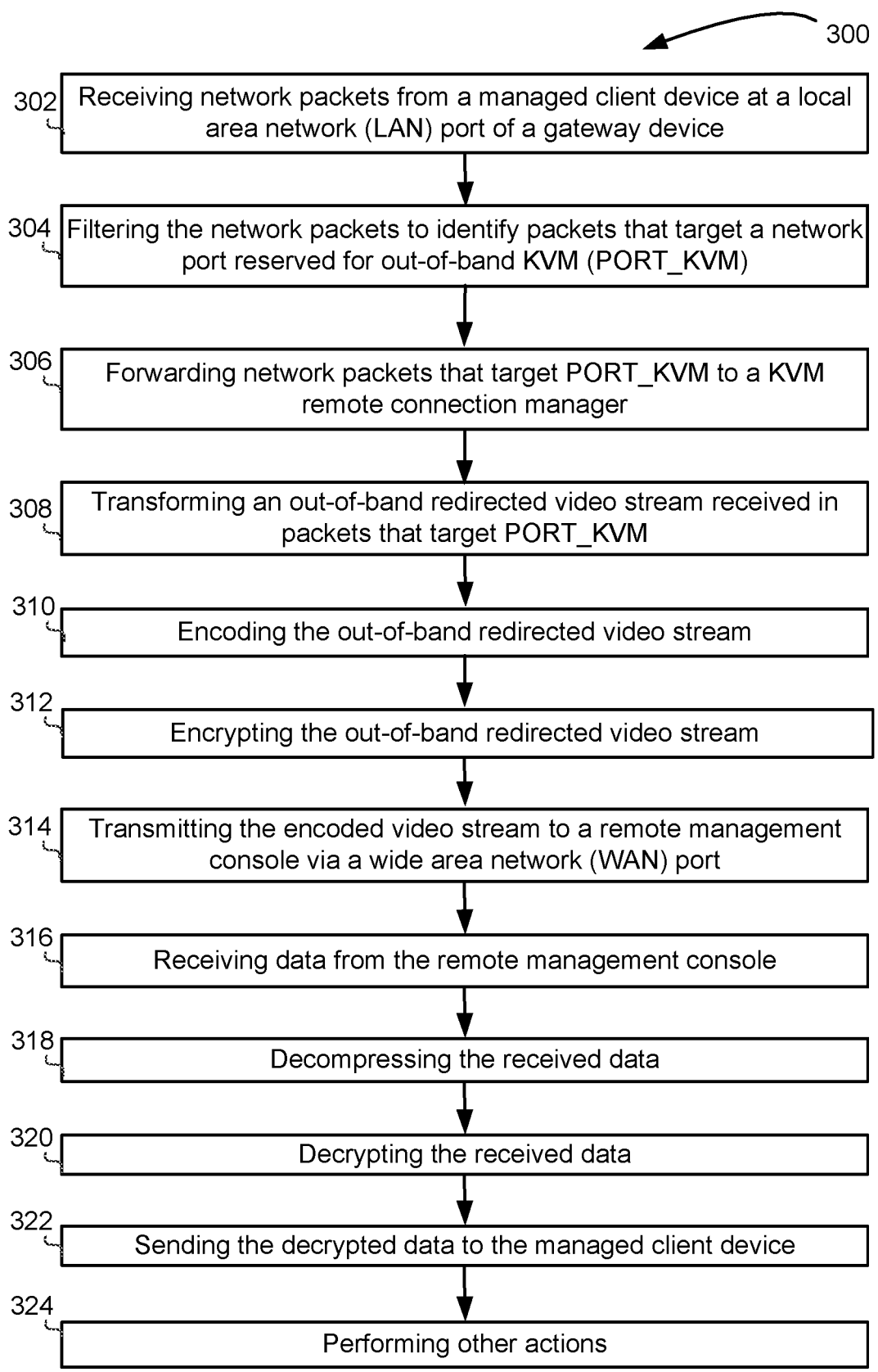
FIG. 3 is a flow diagram illustrating a method of providing a gateway assisted KVM connection, according to additional embodiments.

FIG. 3 is a flow diagram illustrating a method 300 of providing a gateway assisted KVM connection, according to various embodiments. In some embodiments, some or all of the method 300 may be practiced by components shown and/or described with respect to the system 100 of FIG. 1, the cloud and IoT network 400 of FIG. 4, and/or the computing device 500 of FIG. 5.

In some embodiments, at a block 302, the method 300 may include receiving network packets from a managed client device (e.g., managed client 122, 124, or 126) at a LAN port (e.g., LAN port 106) of a gateway device (e.g., gateway 102). In some embodiments, at a block 304 the method 300 may include filtering the network packets (e.g., with network port filter 118) to identify packets that target a network port reserved for out-of-band KVM (e.g., reserved network port 116 (PORT_KVM)). At a block 306, the method 300 may include forwarding network packets that target PORT_KVM to a KVM remote connection manager (e.g., remote connection manager 104), in various embodiments. In some embodiments, the network packets that target PORT_KVM may include an out-of-band redirected video stream (e.g., KVM video stream 136).

In some embodiments, at a block 308, the method 300 may include transforming the out-of-band redirected video stream. In various embodiments, transforming the out-of-band redirected video stream may include changing one or more of a resolution, a frame rate, a color format, a color depth, or any other suitable action. In some embodiments, at a block 310, the method 300 may include encoding the out-of-band redirected video stream (e.g., with video encoder/decoder 110). In some embodiments, at a block 312, the method 300 may include encrypting the out-of-band redirected video stream (e.g., with cryptologic engine 112).

In various embodiments, at a block 314, the method 300 may include transmitting the encoded video stream to a remote management console (e.g., remote management console 134) via a WAN port (e.g., WAN port 108). In some embodiments, the remote management console may decode and/or decrypt the encoded video stream and may display the video to a viewer (e.g., on the display 140).

In some embodiments, at a block 316, the method 300 may include receiving data (e.g., input data 138) from the remote management console. In various embodiments, the received data may include data representing a keyboard signal, a mouse signal, a boot image, or any other suitable data. In some embodiments, the data received from the remote management console may be encrypted, compressed, or encoded. In various embodiments, at a block 318, the method 300 may include decompressing the received data (e.g., with data decompressor 114). In some embodiments, at a block 320, the method 300 may include decrypting the received data (e.g., with cryptologic engine 112). In various embodiments, the processes in blocks 318 and 320 may be performed in reverse order. In various embodiments, at a block 322, the method 300 may include sending the decrypted data to the managed client device via the LAN port 106. In some embodiments, at a block 324, the method 300 may include performing other actions. In some embodiments, some or all actions described with respect to the method 200 may be performed in the method 300.

Figure 4:
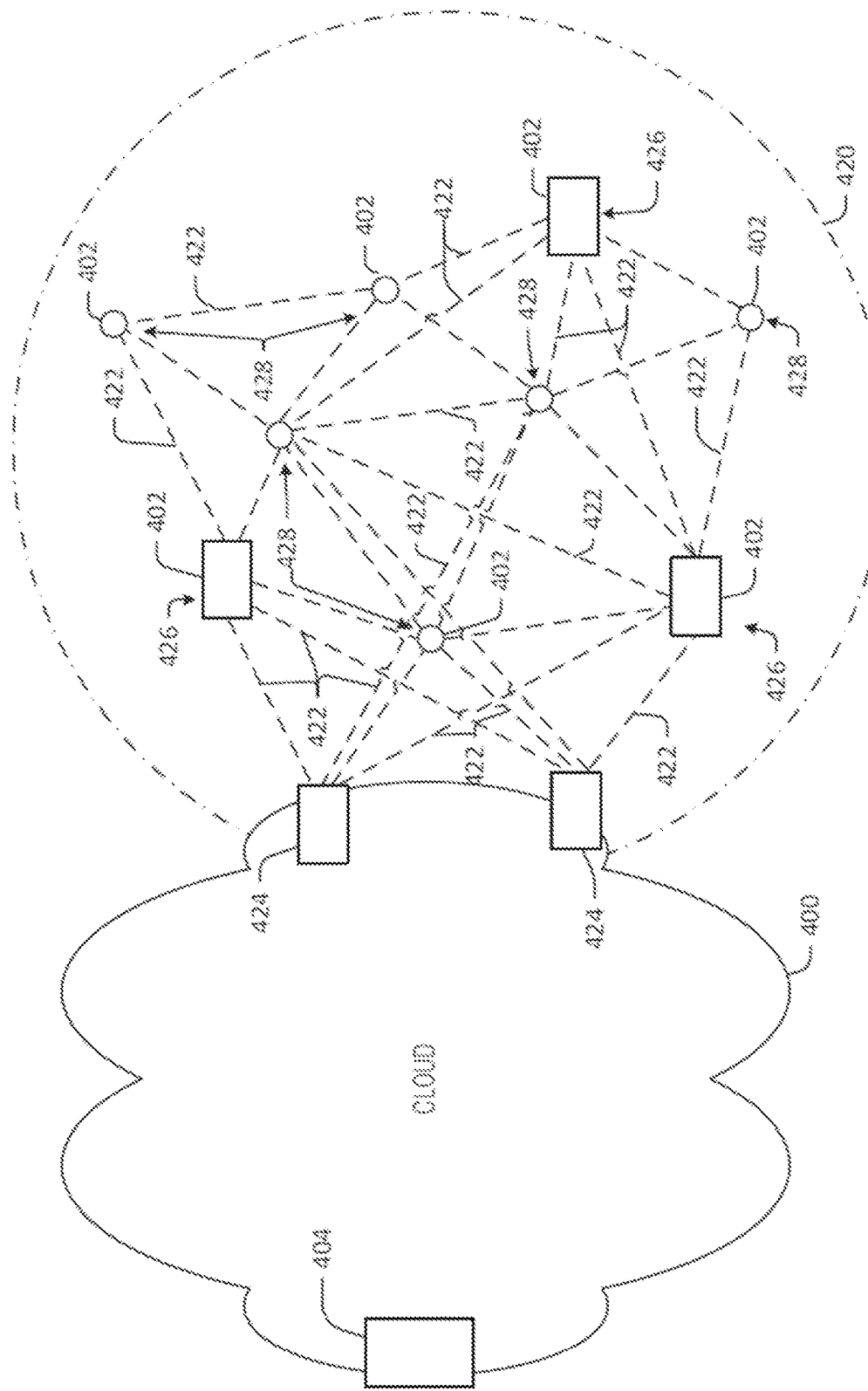
FIG. 4 is a diagram schematically illustrating a topology of a cloud and Internet of Things (IoT) network, according to various embodiments.

FIG. 4 is a diagram schematically illustrating a topology of a cloud and Internet of Things (IoT) network 400, according to various embodiments. In some embodiments, the cloud and IoT network 400 may be a mesh network. In some embodiments, the cloud and IoT network 400 may include a cloud computing network, or cloud 401, in communication with a mesh network of IoT devices 402, that may be termed a fog 420, operating at the edge of the cloud 401. To simplify the diagram, not every IoT device 402 is labeled. In some embodiments, the cloud 401 may include a server 404 that may be or include a remote management console (e.g., remote management console 134).

In some embodiments, the fog 420 may be considered to be a massively interconnected network where a number of IoT devices 402 are in communication with each other, for example, by communication links 422. In various embodiments, the communication links 422 may include wired communication links, wireless communication links, and/or a combination of wired and wireless communication links. Not all communication links are shown and/or labeled for clarity. In some embodiments, one or more of the communication links 422 may be radio communication links. In some embodiments, the cloud and IoT network 400 may be established and/or operated using the open interconnect consortium (OIC) standard specification 1.0 released by the Open Connectivity Foundation™ (OCF) in December 2015, or a newer version of the OIC standard specification. This standard allows devices to discover each other and establish communications for interconnects. Other interconnection protocols may also be used in some embodiments, including, for example, the AllJoyn protocol from the AllSeen alliance, the optimized link state routing (OLSR) Protocol, or the better approach to mobile ad-hoc networking (B.A.T-.M.A.N.), or any other suitable technique or protocol.

Three types of IoT devices 402 are shown in this example, gateways 424, data aggregators 426, and sensors 428, although any suitable combination of IoT devices 402 and functionality may be used in various embodiments. In some embodiments, one or more of the gateways 424 may correspond to an edge or Fog gateway having components and/or functionality described with respect to the KVM dedicated or KVM enhanced embodiments of gateway 102 of FIG. 1, including the KVM remote connection manager 104. The gateways 424 may be edge devices that provide communications between the cloud 401 and the fog 420, and may also provide a backend process function for data obtained from the sensors 428, such as motion data, flow data, temperature data, and the like. The data aggregators 426 may collect data from any number of the sensors 428, and may perform the back end processing function for the analysis. The results, raw data, or both may be passed along to the cloud 401 through the gateways 424. The sensors 428 may be full IoT devices 402 in some embodiments, capable of both collecting data and processing the data. In some embodiments, the sensors 428 may be more limited in functionality and may collect the data but may allow the data aggregators 426 or gateways 424 to process the data. In some embodiments, one or more of the data aggregators 426 or other components of the fog 420 may be or include components of a managed client (e.g., the managed client 122, 124, and/or 126 of FIG. 1).

In some embodiments, communications from any IoT device 402 may be passed along the most convenient path between any of the IoT devices 402 to reach the gateways 424. In these networks, the number of interconnections may provide substantial redundancy, allowing communications to be maintained even with the loss of a number of IoT devices 402 in various embodiments. Further, the use of a mesh network may allow IoT devices 402 that are very low power or located at a distance from infrastructure to be used, as the range to connect to another IoT device 402 may be much less than the range to connect to the gateways 424 in some embodiments.

In some embodiments, the IoT devices 402 may be configured using an imperative programming style, (e.g., with each IoT device 402 having a specific function and communication partners). However, in some embodiments, the IoT devices 402 forming the fog 420 may be configured in a declarative programming style, allowing the IoT devices 402 to reconfigure their operations and communications, such as to determine needed resources in response to conditions, queries, and device failures.

Figure 5:
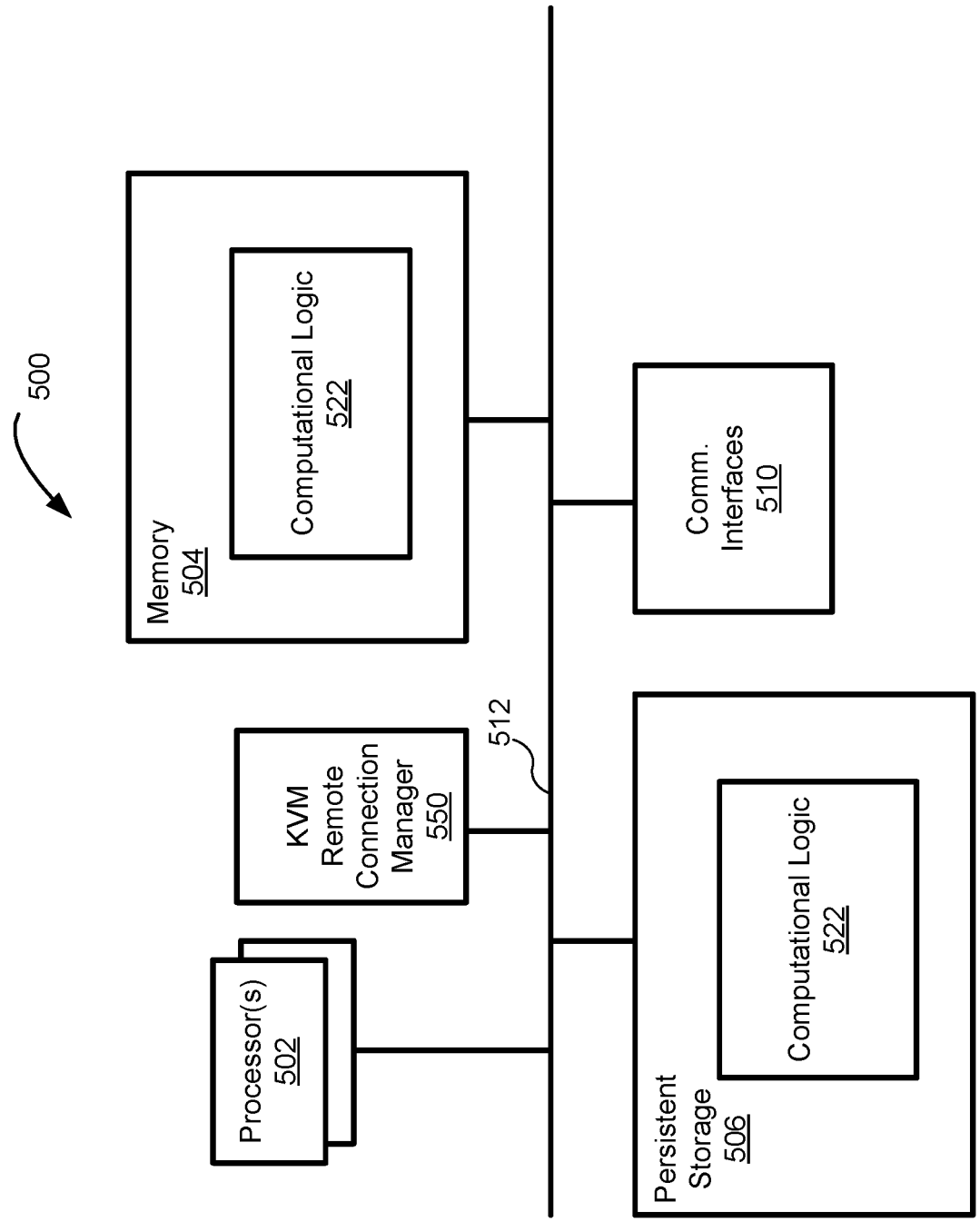
FIG. 5 schematically illustrates an example computer device to be used in providing a gateway assisted KVM connection, according to various embodiments.

FIG. 5 illustrates an example computer device 500 that may include components corresponding to and/or implementing various components and methods of FIGS. 1-4, such as gateway 102 with KVM remote connection manager 104, described with respect to FIG. 1, in accordance with various embodiments. As shown, computer device 500 may include one or more processors 502, each having one or more processor cores, and system memory 504. The processor 502 may include any type of processors, and may include single or multi-core microprocessors, and the like. The processor 502 may be implemented as an integrated circuit in various embodiments. The computer device 500 may include persistent storage devices 506. In general, system memory 504 and/or persistent storage devices 506 may be temporal and/or persistent storage of any type, including, but not limited to, non-volatile memory, optical, magnetic, and/or solid state mass storage, and so forth. Non-volatile memory may include, but is not limited to, electrically erasable programmable read-only memory, phase change memory, resistive memory, and so forth.

The computer device 500 may further include communication interfaces 510 (such as network interface cards, modems, infrared receivers, radio receivers (e.g., Bluetooth), and so forth).

The communication interfaces 510 may include communication chips (not shown) that may be configured to operate the computer device 500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 510 may operate in accordance with other wireless protocols in other embodiments. In some embodiments, the communication interfaces 510 may operate in accordance with one or more wired networking protocols. In some embodiments, the communication interfaces 510 may operate via one or more LAN ports and/or one or more WAN ports.

The above-described computer device 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and persistent storage devices 506 may be employed to store a working copy and a permanent copy of the programming instructions, such as drivers, for the operation of various components of computer device 500, including but not limited to operation of the gateway 102, including the KVM remote connection manager 104 of FIG. 1, an operating system of computer device 500, KVM remote connection manager 550, and/or one or more applications, collectively referred to as computational logic 522. The various elements may be implemented by assembler instructions supported by processor(s) 502 or high-level languages that may be compiled into such instructions. In some embodiments, the KVM remote connection manager 550 may correspond to the KVM remote connection manager 104 described with respect to FIG. 1.

The permanent copy of the programming instructions may be placed into persistent storage devices 506 in the factory or in the field through, for example, a distribution medium (not shown), such as a compact disc (CD), or through communication interface 510 (from a distribution server (not shown)). That is, one or more distribution media having an implementation of the agent program may be employed to distribute the agent and to program various computing devices.

For some embodiments, at least one of processors 502 may be packaged together with a storage medium having all or portions of computational logic 522 configured to facilitate aspects of embodiments described herein to form a System in Package (SiP) or a System on Chip (SoC).

The computer device 500 may include or otherwise be associated with a gateway device or an apparatus that may include components and/or implement methods described with respect to FIGS. 1-4, such as the gateway 102, including the KVM remote connection manager 104, the method 200, the method 300, one or more components of the cloud and IoT mesh network of FIG. 4, and/or other components or methods in accordance with various embodiments. In some embodiments, one or more components such as processor 502 may be included as a part of the gateway 102 such as the KVM remote connection manager 104.

In various implementations, the computer device 500 may comprise one or more components of a gateway, a router, a data center, a laptop, a netbook, a notebook, an ultrabook, a smartphone, a tablet, a personal digital assistant (PDA), an ultra mobile PC, an embedded computing device, a mobile phone, or a digital camera. In further implementations, the computer device 500 may be any other electronic device that processes data.

Figure 6:
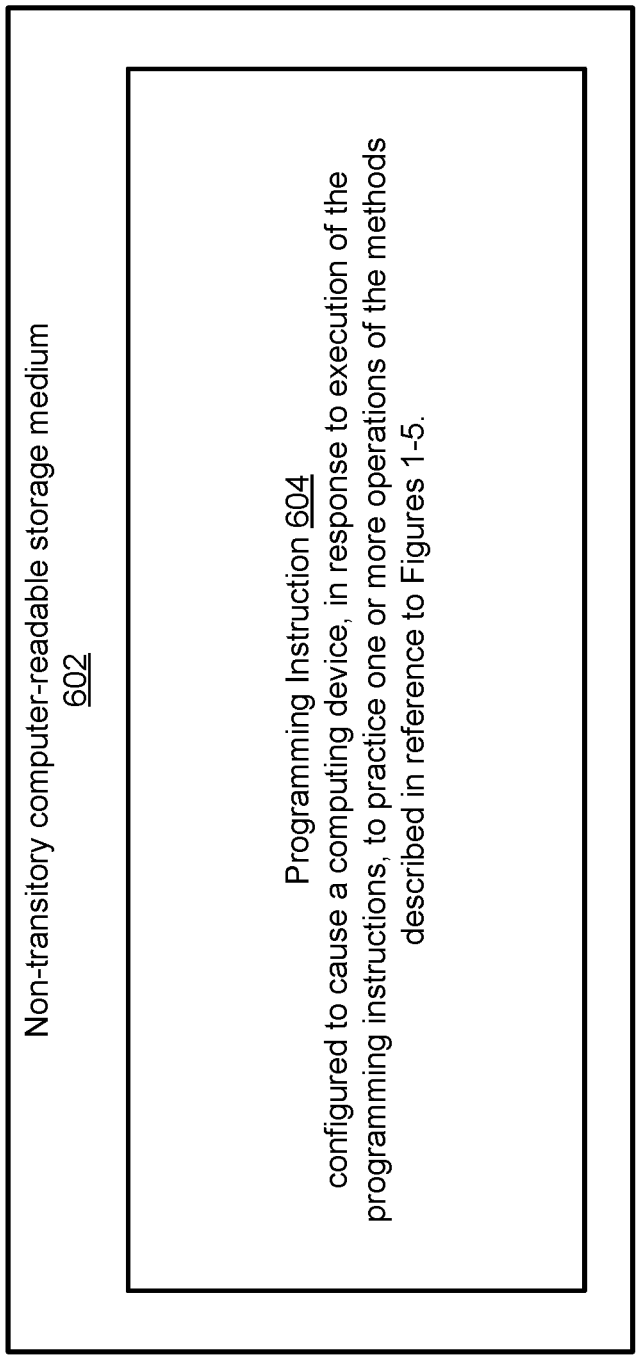
FIG. 6 illustrates an example storage medium with instructions configured to enable an apparatus to practice various aspects of the present disclosure, in accordance with various embodiments.

FIG. 6 illustrates example computer-readable storage medium 602 having instructions configured to practice all or selected ones of the operations associated with the computer device 500 and/or the KVM remote connection manager 550, earlier described with respect to FIG. 5; the gateway 102 including the KVM remote connection manager 104 of FIG. 1; the cloud and IoT network 400 described with respect to FIG. 4; and/or one or more of the methods 200 and/or 300 described with respect to FIGS. 2-3, in accordance with various embodiments. As illustrated, computer-readable storage medium 602 may include a number of programming instructions 604. The storage medium 602 may represent a broad range of non-transitory persistent storage medium known in the art, including but not limited to flash memory, dynamic random access memory, static random access memory, an optical disk, a magnetic disk, etc. Programming instructions 604 may be configured to enable a device, e.g., computer 500 of FIG. 5 and/or gateway 102 of FIG. 1, in response to execution of the programming instructions 604, to perform, e.g., but not limited to, various operations described for the KVM remote connection manager 104, the video encoder/decoder 110, the cryptologic engine 112, the data decompressor 114, the network port filter 118 and/or other components of FIG. 1, one or more components of the cloud and IoT network 400 of FIG. 4, and/or one or more of the methods 200 and/or 300 described with respect to FIGS. 2-3. In alternate embodiments, programming instructions 604 may be disposed on multiple computer-readable storage media 602. In alternate embodiments, storage medium 602 may be transitory, e.g., signals encoded with programming instructions 604.

Referring back to FIG. 5, for an embodiment, at least one of processors 502 may be packaged together with memory having all or portions of computational logic 522 configured to practice aspects described for the KVM remote connection manager 104 and/or other components of FIG. 1, operations of one or more components of the cloud and IoT network 400 of FIG. 4, and/or one or more of the methods 200 and/or 300 described with respect to FIGS. 2-3. For an embodiment, at least one of processors 502 may be packaged together with memory having all or portions of computational logic 522 configured to practice aspects described for the KVM remote connection manager 104 and/or other components of FIG. 1, operations of one or more components of the cloud and IoT network 400 of FIG. 4, and/or one or more of the methods 200 and/or 300 described with respect to FIGS. 2-3 to form a System in Package (SiP). For an embodiment, at least one of processors 502 may be integrated on the same die with memory having all or portions of computational logic 522 configured to practice aspects described for the KVM remote connection manager 104 and/or other components of FIG. 1, operations of one or more components of the cloud and IoT network 400 of FIG. 4, and/or one or more of the methods 200 and/or 300 described with respect to FIGS. 2-3. For an embodiment, at least one of processors 502 may be packaged together with memory having all or portions of computational logic 522 configured to practice aspects of the KVM remote connection manager 104 and/or other components of FIG. 1, operations of one or more components of the cloud and IoT network 400 of FIG. 4, and/or one or more of the methods 200 and/or 300 described with respect to FIGS. 2-3 to form a System on Chip (SoC). For at least one embodiment, the SoC may be utilized in, e.g., but not limited to, a mobile computing device such as a wearable device, an internet of things (IoT) device, and/or a smartphone.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

Figure 7:
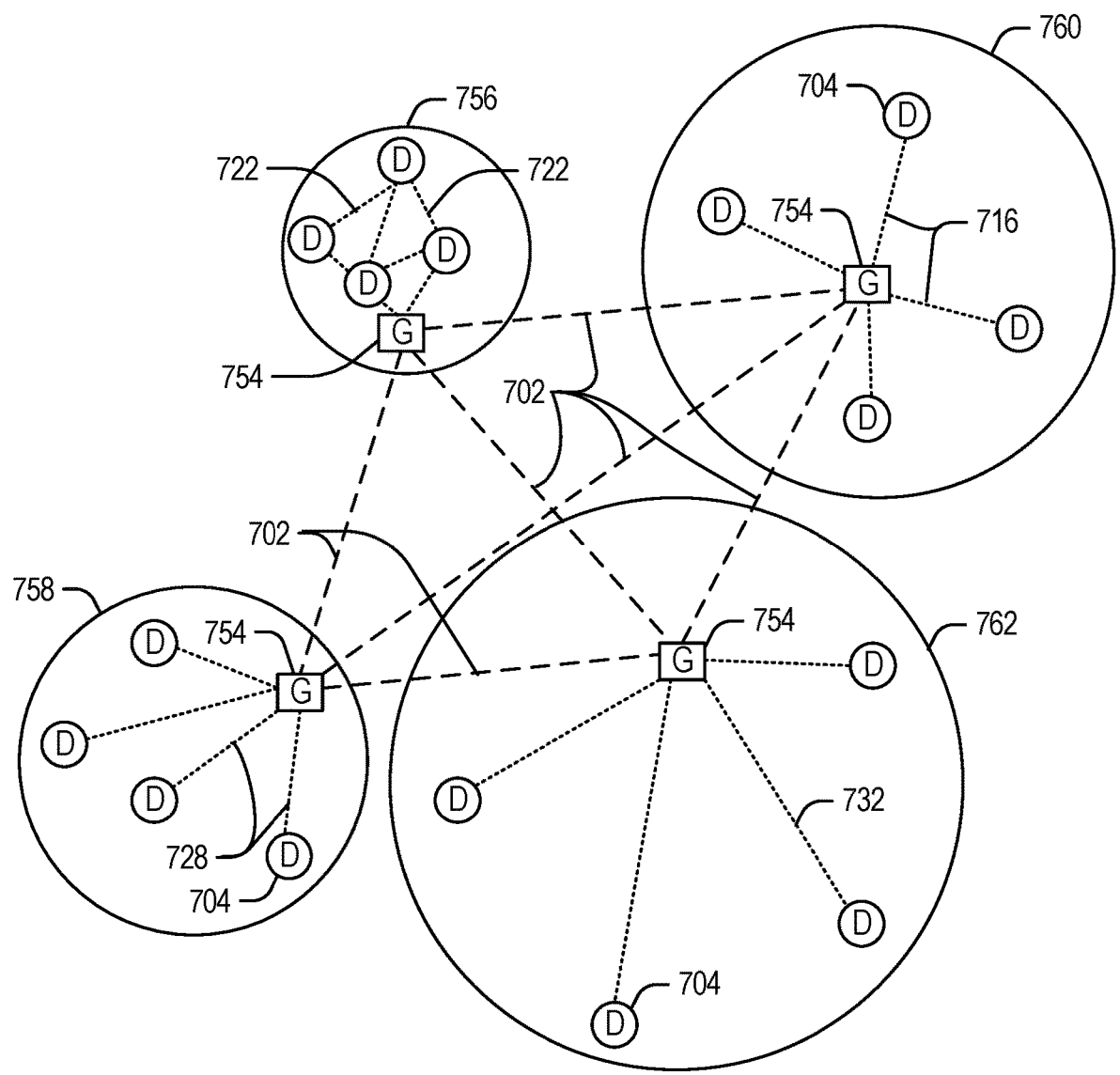
FIG. 7 illustrates a domain topology for respective internet-of-things (IoT) networks coupled through links to respective gateways, according to an example.

FIG. 7 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIG. 7 and FIG. 4, present a number of new challenges in a heterogeneous network of connectivity comprising a combination of wired and wireless technologies.

FIG. 7 specifically provides a simplified drawing of a domain topology that may be used for a number of internet-of-things (IoT) networks comprising IoT devices 704, with the IoT networks 756, 758, 760, 762, coupled through backbone links 702 to respective gateways 754. For example, a number of IoT devices 704 may communicate with a gateway 754 and with each other through the gateway 754. To simplify the drawing, not every IoT device 704, or communications link (e.g., link 716, 722, 728, or 732) is labeled. The backbone links 702 may include any number of wired or wireless technologies, including optical networks, and may be part of a local area network (LAN), a wide area network (WAN), or the Internet. Additionally, such communication links facilitate optical signal paths among both IoT devices 704 and gateways 754, including the use of MUXing/deMUXing components that facilitate interconnection of the various devices. In some embodiments, one or more of the gateways 754 may correspond to an edge or Fog gateway having components and/or functionality described with respect to the KVM dedicated or KVM enhanced embodiments of gateway 102 of FIG. 1, including the KVM remote connection manager 104.

The network topology may include any number of types of IoT networks, such as a mesh network provided with the network 756 using Bluetooth low energy (BLE) links 722. Other types of IoT networks that may be present include a wireless local area network (WLAN) network 758 used to communicate with IoT devices 704 through IEEE 802.11 (Wi-Fi®) links 728, a cellular network 760 used to communicate with IoT devices 704 through an LTE/LTE-A (4G) or 5G cellular network, and a low-power wide area (LPWA) network 762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 704, such as over the backbone links 702, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 758, for instance, may use systems that perform standards conversion to provide multi-standard connectivity, enabling IoT devices 704 using different protocols to communicate. Further systems may provide seamless interconnectivity across a multi-standard infrastructure comprising visible Internet resources and hidden Internet resources.

Communications in the cellular network 760, for instance, may be enhanced by systems that offload data, extend communications to more remote devices, or both. The LPWA network 762 may include systems that perform non-Internet protocol (IP) to IP interconnections, addressing, and routing. Further, each of the IoT devices 704 may include the appropriate transceiver for wide area communications with that device. Further, each IoT device 704 may include other transceivers for communications using additional protocols and frequencies. This is discussed further with respect to the communication environment and hardware of an IoT processing device depicted in FIGS. 8 and 9.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 4.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 8:
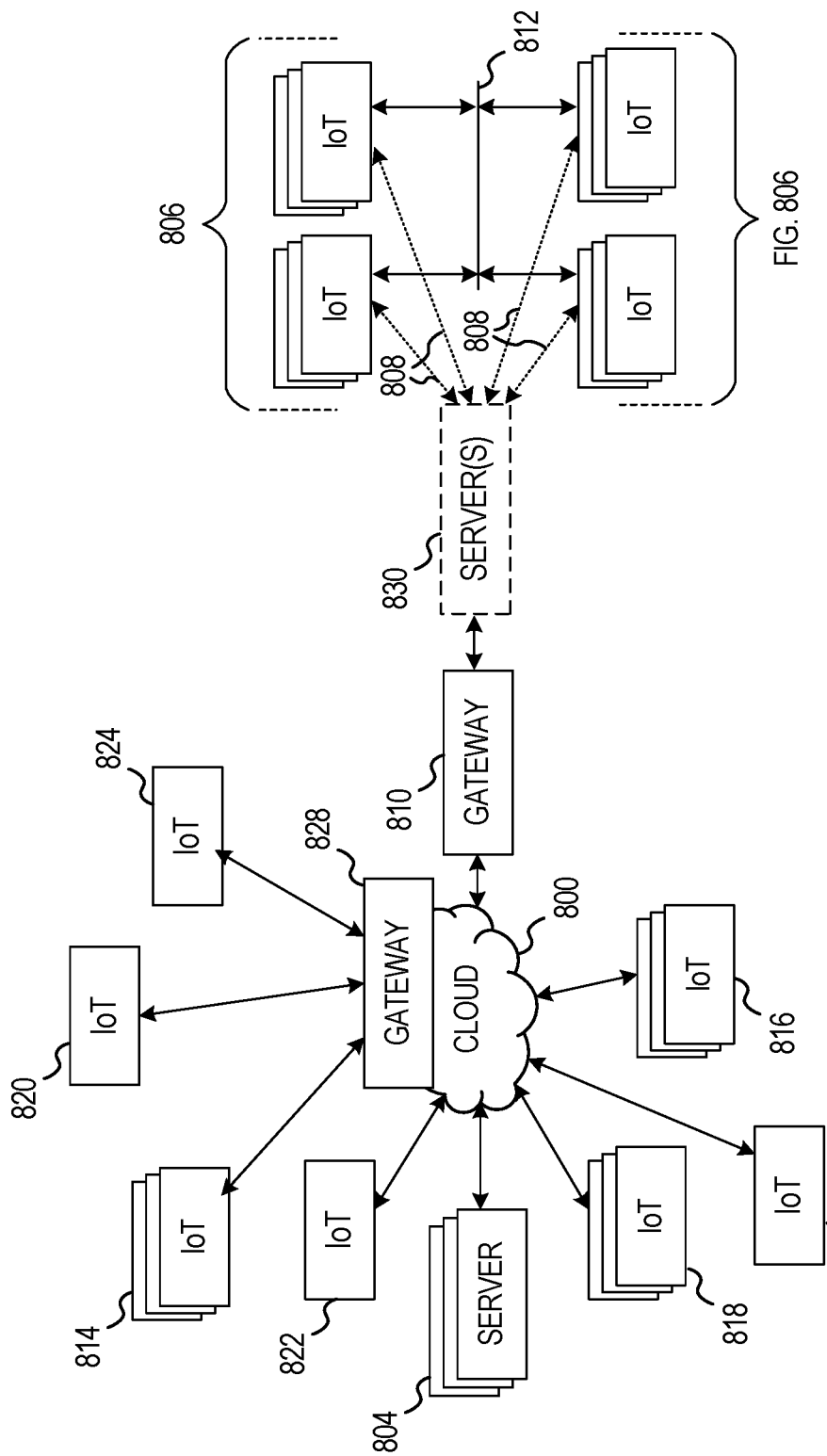
FIG. 8 illustrates a block diagram of a network illustrating communications among a number of IoT devices, according to an example.

FIG. 8 illustrates a drawing of a cloud computing network, or cloud 800, in communication with a number of Internet of Things (IoT) devices. The cloud 800 may represent the Internet, or may be a local area network (LAN), or a wide area network (WAN), such as a proprietary network for a company. The IoT devices may include any number of different types of devices, grouped in various combinations. For example, a traffic control group 806 may include IoT devices along streets in a city. These IoT devices may include stoplights, traffic flow monitors, cameras, weather sensors, and the like. The traffic control group 806, or other subgroups, may be in communication with the cloud 800 through wired or wireless links 808, such as LPWA links, optical links, and the like. Further, a wired or wireless sub-network 812 may allow the IoT devices to communicate with each other, such as through a local area network, a wireless local area network, and the like. The IoT devices may use another device, such as a gateway 810 or 828 to communicate with remote locations such as the cloud 800; the IoT devices may also use one or more servers 830 to facilitate communication with the cloud 800 or with the gateway 810. For example, the one or more servers 830 may operate as an intermediate network node to support a local edge cloud or fog implementation among a local area network. Further, the gateway 828 that is depicted may operate in a cloud-to-gateway-to-many edge devices configuration, such as with the various IoT devices 814, 820, 824 being constrained or dynamic to an assignment and use of resources in the cloud 800. In some embodiments, one or more of the gateways 810 or 828 may correspond to an edge or Fog gateway having components and/or functionality described with respect to the KVM dedicated or KVM enhanced embodiments of gateway 102 of FIG. 1, including the KVM remote connection manager 104. In some embodiments, one or more of the one or more servers 804 or 830 may be or include a remote management console (e.g., remote management console 134).

Other example groups of IoT devices may include remote weather stations 814, local information terminals 816, alarm systems 818, automated teller machines 820, alarm panels 822, or moving vehicles, such as emergency vehicles 824 or other vehicles 826, among many others. Each of these IoT devices may be in communication with other IoT devices, with servers 804, with another IoT fog device or system (not shown, but depicted in FIG. 4), or a combination therein. The groups of IoT devices may be deployed in various residential, commercial, and industrial settings (including in both private or public environments).

As can be seen from FIG. 8, a large number of IoT devices may be communicating through the cloud 800. This may allow different IoT devices to request or provide information to other devices autonomously. For example, a group of IoT devices (e.g., the traffic control group 806) may request a current weather forecast from a group of remote weather stations 814, which may provide the forecast without human intervention. Further, an emergency vehicle 824 may be alerted by an automated teller machine 820 that a burglary is in progress. As the emergency vehicle 824 proceeds towards the automated teller machine 820, it may access the traffic control group 806 to request clearance to the location, for example, by lights turning red to block cross traffic at an intersection in sufficient time for the emergency vehicle 824 to have unimpeded access to the intersection.

Clusters of IoT devices, such as the remote weather stations 814 or the traffic control group 806, may be equipped to communicate with other IoT devices as well as with the cloud 800. This may allow the IoT devices to form an ad-hoc network between the devices, allowing them to function as a single device, which may be termed a fog device or system (e.g., as described above with reference to FIG. 4).

Figure 9:
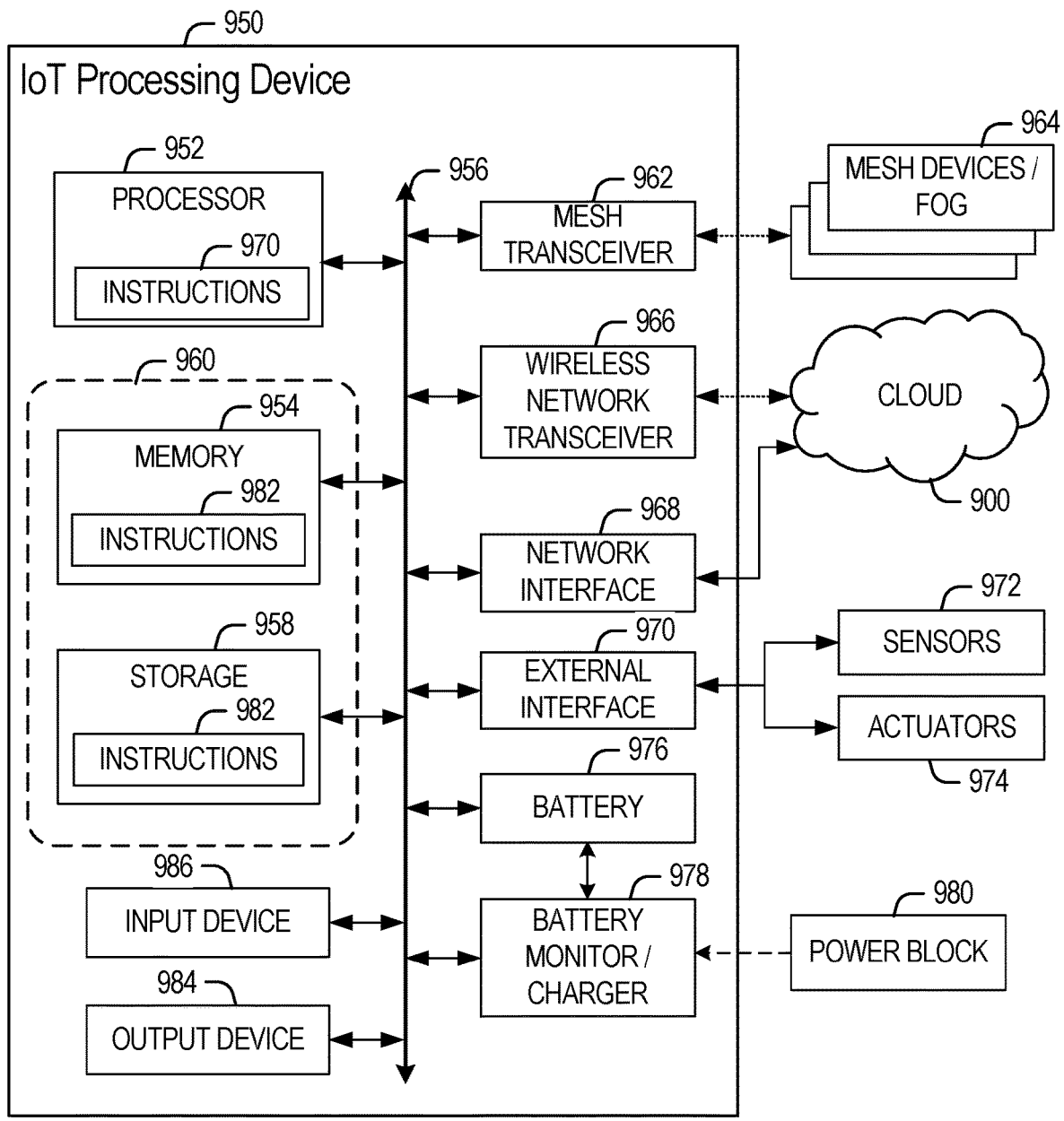
FIG. 9 illustrates a block diagram for an example IoT processing system architecture upon which any one or more of the techniques (e.g., operations, processes, methods, and methodologies) discussed herein may be performed, according to an example.

FIG. 9 is a block diagram of an example of components that may be present in an IoT device 950 for implementing the techniques described herein. The IoT device 950 may include any combinations of the components shown in the example or referenced in the disclosure above. The components may be implemented as ICs, portions thereof, discrete electronic devices, or other modules, logic, hardware, software, firmware, or a combination thereof adapted in the IoT device 950, or as components otherwise incorporated within a chassis of a larger system. Additionally, the block diagram of FIG. 9 is intended to depict a high-level view of components of the IoT device 950. However, some of the components shown may be omitted, additional components may be present, and different arrangement of the components shown may occur in other implementations.

The IoT device 950 may include a processor 952, which may be a microprocessor, a multi-core processor, a multi-threaded processor, an ultra-low voltage processor, an embedded processor, or other known processing element. The processor 952 may be a part of a system on a chip (SoC) in which the processor 952 and other components are formed into a single integrated circuit, or a single package, such as the Edison™ or Galileo™ SoC boards from Intel. As an example, the processor 952 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 952 may communicate with a system memory 954 over an interconnect 956 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDlMMs or MiniDIMMs.

To provide for persistent storage of information such as data, applications, operating systems and so forth, a storage 958 may also couple to the processor 952 via the interconnect 956. In an example, the storage 958 may be implemented via a solid-state disk drive (SSDD). Other devices that may be used for the storage 958 include flash memory cards, such as SD cards, microSD cards, xD picture cards, and the like, and USB flash drives. In low power implementations, the storage 958 may be on-die memory or registers associated with the processor 952. However, in some examples, the storage 958 may be implemented using a micro hard disk drive (HDD). Further, any number of new technologies may be used for the storage 958 in addition to, or instead of, the technologies described, such resistance change memories, phase change memories, holographic memories, or chemical memories, among others.

The components may communicate over the interconnect 956. The interconnect 956 may include any number of technologies, including industry standard architecture (ISA), extended ISA (EISA), peripheral component interconnect (PCI), peripheral component interconnect extended (PCIx), PCI express (PCIe), or any number of other technologies. The interconnect 956 may be a proprietary bus, for example, used in a SoC based system. Other bus systems may be included, such as an I2C interface, an SPI interface, point-to-point interfaces, and a power bus, among others.

The interconnect 956 may couple the processor 952 to a mesh transceiver 962, for communications with other mesh devices 964. The mesh transceiver 962 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 964. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 962 may communicate using multiple standards or radios for communications at different range. For example, the IoT device 950 may communicate with close devices, e.g., within about 10 meters, using a local transceiver based on BLE, or another low power radio, to save power. More distant mesh devices 964, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 966 may be included to communicate with devices or services in the cloud 900 via local or wide area network protocols. The wireless network transceiver 966 may be a LPWA transceiver that follows the IEEE 802.15.4, or IEEE 802.15.4g standards, among others.

The IoT device 950 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 962 and wireless network transceiver 966, as described herein. For example, the radio transceivers 962 and 966 may include an LTE or other cellular transceiver that uses spread spectrum (SPA/SAS) communications for implementing high-speed communications. Further, any number of other protocols may be used, such as Wi-Fi® networks for medium speed communications and provision of network communications.

The radio transceivers 962 and 966 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 966, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 968 may be included to provide a wired communication to the cloud 900 or to other devices, such as the mesh devices 964. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 968 may be included to allow connect to a second network, for example, a NIC 968 providing communications to the cloud over Ethernet, and a second NIC 968 providing communications to other devices over another type of network.

The interconnect 956 may couple the processor 952 to an external interface 970 that is used to connect external devices or subsystems. The external devices may include sensors 972, such as accelerometers, level sensors, flow sensors, optical light sensors, camera sensors, temperature sensors, global positioning system (GPS) sensors, pressure sensors, barometric pressure sensors, and the like. The external interface 970 further may be used to connect the IoT device 950 to actuators 974, such as power switches, valve actuators, an audible sound generator, a visual warning device, and the like.

In some optional examples, various input/output (I/O) devices may be present within, or connected to, the IoT device 950. For example, a display or other output device 984 may be included to show information, such as sensor readings or actuator position. An input device 986, such as a touch screen or keypad may be included to accept input. An output device 984 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 950.

A battery 976 may power the IoT device 950, although in examples in which the IoT device 950 is mounted in a fixed location, it may have a power supply coupled to an electrical grid. The battery 976 may be a lithium ion battery, or a metal-air battery, such as a zinc-air battery, an aluminum-air battery, a lithium-air battery, and the like.

A battery monitor/charger 978 may be included in the IoT device 950 to track the state of charge (SoCh) of the battery 976. The battery monitor/charger 978 may be used to monitor other parameters of the battery 976 to provide failure predictions, such as the state of health (SoH) and the state of function (SoF) of the battery 976. The battery monitor/charger 978 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 978 may communicate the information on the battery 976 to the processor 952 over the interconnect 956. The battery monitor/charger 978 may also include an analog-to-digital (ADC) convertor that allows the processor 952 to directly monitor the voltage of the battery 976 or the current flow from the battery 976. The battery parameters may be used to determine actions that the IoT device 950 may perform, such as transmission frequency, mesh network operation, sensing frequency, and the like.

A power block 980, or other power supply coupled to a grid, may be coupled with the battery monitor/charger 978 to charge the battery 976. In some examples, the power block 980 may be replaced with a wireless power receiver to obtain the power wirelessly, for example, through a loop antenna in the IoT device 950. A wireless battery charging circuit, such as an LTC4020 chip from Linear Technologies of Milpitas, Calif., among others, may be included in the battery monitor/charger 978. The specific charging circuits chosen depend on the size of the battery 976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 958 may include instructions 982 in the form of software, firmware, or hardware commands to implement the techniques described herein. Although such instructions 982 are shown as code blocks included in the memory 954 and the storage 958, it may be understood that any of the code blocks may be replaced with hardwired circuits, for example, built into an application specific integrated circuit (ASIC).

In an example, the instructions 982 provided via the memory 954, the storage 958, or the processor 952 may be embodied as a non-transitory, machine-readable medium 960 including code to direct the processor 952 to perform electronic operations in the IoT device 950. The processor 952 may access the non-transitory, machine-readable medium 960 over the interconnect 956. For instance, the non-transitory, machine-readable medium 960 may be embodied by devices described for the storage 958 of FIG. 9 or may include specific storage units such as optical disks, flash drives, or any number of other hardware devices. The non-transitory, machine-readable medium 960 may include instructions to direct the processor 952 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

EXAMPLES

Example 1 may include a gateway apparatus comprising: a keyboard, video, or mouse (KVM) remote connection manager; a local area network (LAN) port coupled with the KVM remote connection manager; and a wide area network (WAN) port coupled with the KVM remote connection manager, wherein the KVM remote connection manager includes a video encoder to encode an out-of-band redirected video stream received at the LAN port from a managed client device, destined for a remote management console, and send the encoded video stream to the remote management console via the WAN port.

Example 2 may include the subject matter of Example 1, wherein the KVM remote connection manager also includes a cryptologic engine to encrypt the encoded video stream.

Example 3 may include the subject matter of Example 2, wherein the cryptologic engine is also to decrypt one or more of an encrypted keyboard signal, an encrypted mouse signal, or encrypted data received at the WAN port from the remote management console.

Example 4 may include the subject matter of any one of Examples 1-3, wherein the KVM remote connection manager is to change one or more of a resolution, a frame rate, a color format, or a color depth of the video stream before sending the encoded video stream to the remote management console.

Example 5 may include the subject matter of any one of Examples 1-4, wherein the KVM remote connection manager also includes a network port filter coupled with the LAN port to identify KVM remote network packets that target a network port of the gateway apparatus reserved for out-of-band KVM.

Example 6 may include the subject matter of Example 5, wherein the out-of-band redirected video stream is received at the LAN port in packets that target the network port of the gateway apparatus reserved for out-of-band KVM.

Example 7 may include the subject matter of any one of Examples 5-6, wherein the network port of the gateway apparatus is a first network port, and the gateway apparatus further includes routing circuitry to route network traffic received at one or more of the LAN port or the WAN port that targets one or more additional network ports different than the first network port.

Example 8 may include the subject matter of any one of Examples 1-7, wherein the out-of-band redirected video stream received at the LAN port includes raw video frames.

Example 9 may include the subject matter of any one of Examples 1-8, wherein the KVM remote connection manager also includes a data decompressor to decompress data received at the WAN port from the remote management console.

Example 10 may include a method of gateway assisted provision of a keyboard, video, and mouse (KVM) connection comprising: receiving, at a local area network (LAN) port of a gateway device, an out-of-band redirected video stream from a managed client device, destined for a remote management console; encoding, by the gateway device, the out-of-band redirected video stream; and transmitting, by the gateway device, the encoded video stream to the remote management console.

Example 11 may include the subject matter of Example 10, wherein the out-of-band redirected video stream is received in packets that target a network port of the gateway device reserved for out-of-band KVM.

Example 12 may include the subject matter of Example 11, further comprising: filtering, by the gateway device, packets received at the LAN port to identify packets that target the network port of the gateway device reserved for out-of-band KVM.

Example 13 may include the subject matter of any one of Examples 10-12, wherein transmitting the encoded video stream includes transmitting the encoded video stream via a wide area network (WAN) port of the gateway device.

Example 14 may include the subject matter of any one of Examples 10-13, further comprising one or more of changing, by the gateway device, one or more of a resolution, a frame rate, a color format, or a color depth of the video stream before transmitting the encoded video stream to the remote management console.

Example 15 may include the subject matter of any one of Examples 10-14, further comprising encrypting, by the gateway device, the encoded video stream before transmitting the encoded video stream to the remote management console.

Example 16 may include the subject matter of any one of Examples 10-15, further comprising decrypting, by the gateway device, one or more of an encrypted keyboard signal, an encrypted mouse signal, or encrypted data received at a wide area network (WAN) port of the gateway device from the remote management console.

Example 17 may include the subject matter of Example 16, further comprising sending the decrypted keyboard signal, mouse signal, or data to the managed client device via the LAN port.

Example 18 may include one or more non-transitory computer-readable media comprising instructions that cause a gateway apparatus, in response to execution of the instructions by the gateway apparatus to: encode an out-of-band keyboard, video, and mouse (KVM) video stream received from a managed client device at a local area network (LAN) port of the gateway apparatus, destined for a remote management console; and transmit the encoded video stream to the remote management console through a wide area network (WAN) port of the gateway apparatus.

Example 19 may include the subject matter of Example 18, wherein the instructions are also to cause the gateway apparatus to change one or more of a resolution, a frame rate, a color format, or a color depth of the video stream before transmitting the encoded video stream to the remote management console.

Example 20 may include the subject matter of any one of Examples 18-19, wherein the instructions are also to cause the gateway apparatus to filter packets received at the LAN port to identify packets that target a network port of the gateway apparatus reserved for out-of-band KVM.

Example 21 may include the subject matter of Example 20, wherein the out-of-band KVM video stream is received at the LAN port in packets that target the network port of the gateway apparatus reserved for out-of-band KVM.

Example 22 may include the subject matter of any one of Examples 18-21, wherein the instructions are also to cause the gateway apparatus to encrypt the encoded video stream before transmitting the encoded video stream to the remote management console.

Example 23 may include the subject matter of any one of Examples 18-22, wherein the instructions are also to cause the gateway apparatus to decrypt one or more of an encrypted keyboard signal, an encrypted mouse signal, or encrypted data received at the WAN port from the remote management console.

Example 24 may include the subject matter of any one of Examples 18-23, wherein the instructions are also to cause the gateway apparatus to decompress one or more of a boot image or data received at the WAN port from the remote management console.

Example 25 may include the subject matter of any one of Examples 18-24, wherein the out-of-band KVM video stream received at the LAN port includes raw video frames.

Example 26 may include a gateway apparatus comprising: means for receiving an out-of-band keyboard, video, and mouse (KVM) video stream from a managed client device, destined for a remote management console; means for encoding the out-of-band KVM video stream; and means for transmitting the encoded video stream to the remote management console.

Example 27 may include the subject matter of Example 26, further comprising means for filtering packets received at a local area network (LAN) port to identify packets that target a network port reserved for out-of-band KVM.

Example 28 may include the subject matter of Example 27, wherein the out-of-band KVM video stream is received at the LAN port in packets that target the network port reserved for out-of-band KVM.

Example 29 may include the subject matter of any one of Examples 26-28, further comprising means for changing one or more of a resolution, a frame rate, a color format, or a color depth of the out-of-band KVM video stream before transmitting the encoded video stream to the remote management console.

Example 30 may include the subject matter of any one of Examples 26-29, further comprising means for encrypting the encoded video stream before transmitting the encoded video stream to the remote management console.

Example 31 may include the subject matter of any one of Examples 26-30, further comprising means for decrypting one or more of an encrypted keyboard signal, an encrypted mouse signal, or encrypted data received at a wide area network (WAN) port of the gateway apparatus from the remote management console.

Example 32 may include the subject matter of any one of Examples 26-31, further comprising means for decompressing one or more of a boot image or data received at a wide area network (WAN) port of the gateway apparatus from the remote management console.

Example 33 may include the subject matter of any one of Examples 26-32, wherein the out-of-band KVM video stream includes raw video frames.

Various embodiments may include any suitable combination of the above-described embodiments including alternative (or) embodiments of embodiments that are described in conjunctive form (and) above (e.g., the "and" may be "and/or"). Furthermore, so me embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A gateway apparatus comprising:
   a keyboard, video, or mouse (KVM) remote connection manager;
   a local area network (LAN) port coupled with the KVM remote connection manager to couple the gateway apparatus to one or more managed client devices of a remote management console, over a LAN to which the gateway apparatus and the one or more managed client devices are coupled; and
   a wide area network (WAN) port coupled with the KVM remote connection manager to couple the gateway apparatus to the remote management console over a WAN, wherein the KVM remote connection manager includes a video encoder to encode an out-of-band redirected video stream received at the LAN port, via the LAN, from one of the one or more managed client devices, destined for the remote management console, and send the encoded video stream to the remote management console via the WAN port and the WAN;
   wherein the KVM remote connection manager is to change one or more of a resolution, a frame rate, a color format, or a color depth of the video stream before sending the encoded video stream to the remote management console, via the WAN port and the WAN, and
   wherein the KVM remote connection manager also includes a network port filter coupled with the LAN port to identify KVM remote network packets that target the LAN port of the gateway apparatus, which is reserved for out-of-band KVM.

2. The gateway apparatus of claim 1, wherein the KVM remote connection manager also includes a cryptologic engine to encrypt the encoded video stream.

3. The gateway apparatus of claim 2, wherein the cryptologic engine is also to decrypt one or more of an encrypted keyboard signal, an encrypted mouse signal, or encrypted data received at the WAN port, via the WAN, from the remote management console, for one or more of the managed client devices.

4. The gateway apparatus of claim 1, wherein the out-of-band redirected video stream is received at the LAN port in packets that target the LAN port of the gateway apparatus, which is reserved for out-of-band KVM.

5. The gateway apparatus of claim 1, wherein the LAN port and the WAN port of the gateway apparatus are a first and a second network port of the gateway apparatus, and the gateway apparatus further includes routing circuitry to route network traffic received at one or more of the LAN port or the WAN port that targets one or more additional network ports of the gateway apparatus, that are different than the first and second network ports.

6. The gateway apparatus of claim 1, wherein the out-of-band redirected video stream received at the LAN port includes raw video frames.

7. The gateway apparatus of claim 1, wherein the KVM remote connection manager also includes a data decompressor to decompress data received at the WAN port from the remote management console, via the WAN.

8. A method of gateway assisted provision of a keyboard, video, and mouse (KVM) connection comprising:
   receiving, at a local area network (LAN) port of a gateway device, an out-of-band redirected video stream sent over a LAN, from a managed client device, destined for a remote management console remotely disposed from the managed client device and the gateway device;
   encoding, by the gateway device, the out-of-band redirected video stream; and
   transmitting, by the gateway device, the encoded video stream to the remote management console via a wide area network (WAN) port, coupling the gateway device to a WAN, to which the remote management console is also coupled;
   wherein the out-of-band redirected video stream is received in packets that target the LAN port of the gateway device, which is reserved for out-of-band KVM, and the method further comprises:
   filtering, by the gateway device, packets received at the LAN port to identify packets that target the LAN port of the gateway device, which is reserved for out-of-band KVM, and
   one or more of changing, by the gateway device, one or more of a resolution, a frame rate, a color format, or a color depth of the video stream before transmitting the encoded video stream to the remote management console via the WAN port and the WAN.

9. The method of claim 8, further comprising encrypting, by the gateway device, the encoded video stream before transmitting the encoded video stream to the remote management console via the WAN port and the WAN.

10. The method of claim 8, further comprising decrypting, by the gateway device, one or more of an encrypted keyboard signal, an encrypted mouse signal, or encrypted data received at the WAN port of the gateway device from the remote management console, which sent the one or more encrypted keyboard signal, encrypted mouse signal, or encrypted data via the WAN.

11. The method of claim 10, further comprising sending the decrypted keyboard signal, mouse signal, or data to the managed client device via the LAN port and the LAN.

12. One or more non-transitory computer-readable media comprising instructions that cause a gateway apparatus, in response to execution of the instructions by the gateway apparatus to:
   encode an out-of-band keyboard, video, and mouse (KVM) video stream received from a managed client device at a local area network (LAN) port of the gateway apparatus, destined for a remote management console, the LAN port coupling the gateway apparatus to a LAN to which the managed client device is coupled; and transmit the encoded video stream to the remote management console through a wide area network (WAN) port of the gateway apparatus, the WAN port coupling the gateway apparatus to a WAN to which the remote management console is coupled;

wherein the instructions are also to cause the gateway apparatus to:

change one or more of a resolution, a frame rate, a color format, or a color depth of the video stream before transmitting the encoded video stream to the remote management console via the WAN port and the WAN, and filter packets received at the LAN port to identify packets that target the LAN port of the gateway apparatus, which is reserved for out-of-band KVM.

13. The one or more non-transitory computer-readable media of claim 12, wherein the out-of-band KVM video stream is received at the LAN port in packets that target the LAN port of the gateway apparatus, which is reserved for out-of-band KVM.

14. The one or more non-transitory computer-readable media of claim 12, wherein the instructions are also to cause the gateway apparatus to encrypt the encoded video stream before transmitting the encoded video stream to the remote management console via the WAN port and the WAN.

15. The one or more non-transitory computer-readable media of claim 12, wherein the instructions are also to cause the gateway apparatus to decrypt one or more of an encrypted keyboard signal, an encrypted mouse signal, or encrypted data received at the WAN port from the remote management console, which sent the one or more encrypted keyboard signal, encrypted mouse signal, or encrypted data through the WAN.

16. The one or more non-transitory computer-readable media of claim 12, wherein the instructions are also to cause the gateway apparatus to decompress one or more of a boot image or data received at the WAN port from the remote management console, which sent the one or more of boot image or data through the WAN.

17. The one or more non-transitory computer-readable media of claim 12, wherein the out-of-band KVM video stream received at the LAN port includes raw video frames.

\* \* \* \* \*